Jan. 17, 1967     H. VISSERS     3,298,696
APPARATUS FOR SPREADING OR SOWING GRANULAR MATERIALS
Original Filed Aug. 3, 1964
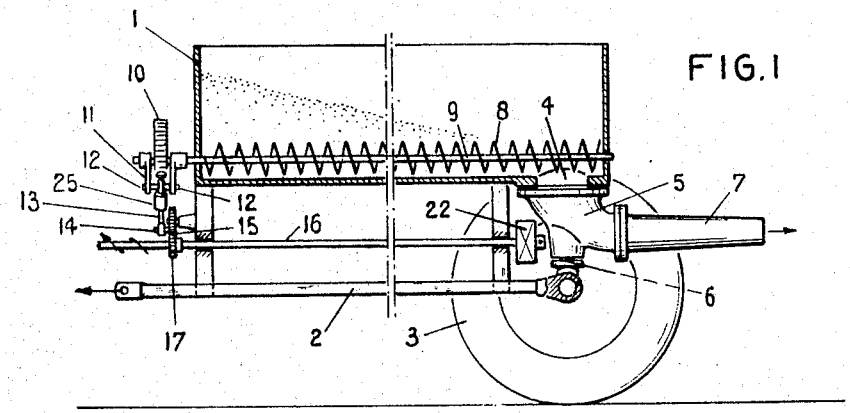
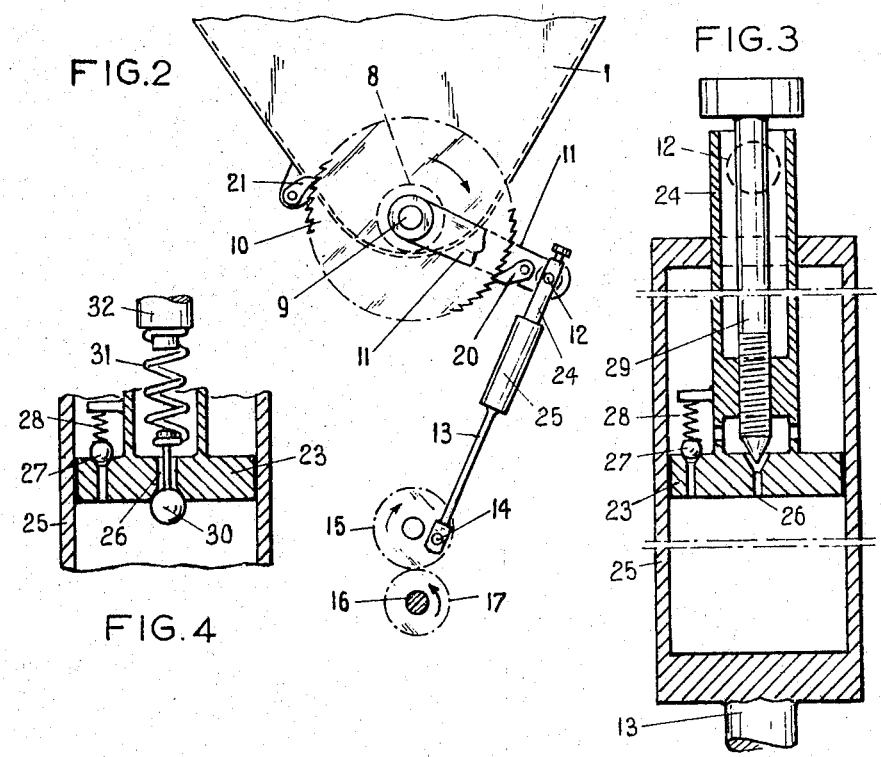
INVENTOR
HERBERT VISSERS
BY
ATTORNEY 3,298,696
APPARATUS FOR SPREADING OR SOWING
GRANULAR MATERIALS
Herbert Vissers, Nieuw Vennep, Netherlands, assignor to Landbouwwerktuigen- en Machinefabriek H. Vissers N.V., Nieuw Vennep, Netherlands, a company of Netherlands
Original application Aug. 3, 1964, Ser. No. 387,050. Divided and this application Apr. 12, 1966, Ser. No. 542,156
Claims priority, application Netherlands, Oct. 18, 1963, 299,423
3 Claims. (Cl. 275—15)

This application is a division of my copending application Ser. No. 387,050 field August 3, 1964.

The invention relates to an apparatus for spreading or sowing granular material of the type, having a trough-shaped storage hopper supported by a travelling frame, an outlet in the bottom of said hopper, a spreading member movable under said outlet and a shaft with a conveying screw for feeding material to the hopper outlet.

When the hopper has in relation to its width a greater length, the drawback occurs that the hopper will not be emptied, so that a rather large quantity of material remains therein. When the hopper is completely or for the greater part filled with granular material, said material exerts such a heavy pressure that the conveying screw encounters a large resistance at the material and the grains of the material due to the friction at the screw at least partially are pulverized.

Object of the invention is to remove said drawback and according to the invention the driving mechanism for the conveying screw comprises a toothed ratchet wheel secured to the conveying screw shaft, an arm having one end rotatable on said shaft, a pawl pivoted on said arm in driving engagement with the teeth of the ratchet wheel, driving means, including a crank pin pivotally connected to one end of a driving rod, a fluid filled cylinder (or a piston) being formed at the other end of said rod and a piston slidable in said cylinder being provided with means pivotally connecting said piston to said arm, the cylinder spaces at both sides of the piston communicating with each other by a flow channel. As with a completely filled hopper the required driving force will be large, the fluid in the cylinder will be compressed and the conveying screw will remain stationary. According to the hopper is emptied the movement of the driving member for a part will not be taken up by the fluid filled cylinder dependent on the area of the flow channel connecting both sides of the piston, so that the useful movement of the driving member will be increased. The resistance encountered by the conveying screw at the granular material is then smaller accordingly, so that not only pulverizing of the material is prevented but also the power consumption of the conveying screw will be smaller.

The invention will be further described with reference to the accompanying drawing illustrating an embodiment of an apparatus according to the invention.

In the drawing FIG. 1 is a longitudinal sectional elevation of the storage hopper and FIG. 2 is an end view on enlarged scale of the lower part of the hopper at the driven side of the conveying screw.

FIG. 3 is a longitudinal sectional view of the cylinder shown in FIG. 4 on a still larger scale and FIG. 4 is a sectional view of a piston of modified construction.

As appears from FIG. 1 the storage hopper 1 is carried by a frame 2 provided with a pair of ground wheels 3. Below the outlet 4 of the hopper a bowl 5 is supported on the frame 2 by means of a journal 6 for angularly swinging movement and a spout 7 extends at the bowl 5. Near the bottom of the hopper 1 a conveying screw 8 is rotatably mounted and has a ratchet wheel 10 secured to its shaft 9 at the end thereof projecting out of the hopper. An arm 11 (FIG. 2) is rotatable on the shaft 9 and carries a pawl 20 meshing with the teeth of wheel 10. A rod 13 is formed at its upper end to a cylinder 25 and with its lower end engages a crank pin 14 on a toothed wheel 15 receiving its rotation from a wheel 17 secured on a shaft 16.

A piston 23 slidable in the cylinder 25 and having a hollow rod 24 engages the arm 11 by means of journals 12 each extending in a bore of the cheeks of arm 11. The cylinder 25 is filled with liquid which through a bore 26 provided in the piston 23 may flow from the one side of the piston to the other side thereof. When during rotation of wheel 15 the hopper 1 is already partly emptied, the conveying screw 8 will encounter less resistance at the material and dependent on the passage area of the bore 26 less liquid will escape from the space above the piston 23, so that the piston is moved downwards and the ratchet wheel 10 will correspondingly be rotated through one or more teeth. As soon as during rotation of the wheel 15 the crank pin 14 reaches its lowermost position the cylinder 25 upon further rotation of the wheel 15 will move upwards, so that the liquid through bore 26 escapes from the space below the piston. The liquid may also escape upwards by a valve 27 loaded by a spring 28.

For preventing the ratchet wheel 10 from rotating backwards a counter pawl 21 is provided.

The passage area of bore 26 may be adjusted by means of a needle 29. With the modification shown in FIG. 4 said needle has been replaced by a ball valve 30 connected by a draw-spring 31 to a vertically adjustable rod 32.

The shaft 16 of wheel 17 may be driven by the take-off shaft of a tractor to which the frame 2 of the apparatus is coupled. The shaft 16 may also be used for driving the bowl 5 with the spout 7 through the intermediary of a suitable gear 22 (FIG. 1).

What I claim is:

1. An improved ratchet drive mechanism for an apparatus for spreading or sowing granular material of the type having a trough-shaped storage hopper supported by a travelling frame, an outlet in the bottom of said hopper, a spreading member movable under said outlet, and a shaft with a conveying screw for feeding material to the hopper outlet, comprising a toothed ratchet wheel secured to said conveying screw shaft, an arm having one end rotatable on said shaft, a pawl pivoted on said arm in driving engagement with the teeth of the ratchet wheel, and driving means including a crank pin pivotally connected to one end of a driving rod, a fluid filled cylinder and piston interposed between the other end of said rod and said arm, one of said cylinder and piston being secured to said rod and the other being pivotally connected to said arm, and a flow channel communicating the cylinder spaces at both sides of the piston.

2. Apparatus as claimed in claim 1, wherein means is provided for adjusting the passage area of said flow channel.

3. Apparatus as claimed in claim 1, wherein a valve having an adjustable load is provided to control said flow channel communicating both sides of the piston.

References Cited by the Examiner

UNITED STATES PATENTS

| | | | |
|---|---|---|---|
| 972,761 | 10/1910 | Gauntt | 74—116 X |
| 1,150,235 | 8/1915 | Ward | 74—116 |
| 1,788,729 | 2/1928 | Meier | 74—116 X |
| 2,023,579 | 12/1935 | Dodge | 74—600 X |
| 2,407,104 | 9/1949 | Schmied | 275—5 X |
| 2,614,849 | 10/1952 | Holben | 275—8 |
| 3,127,778 | 4/1964 | Koch | 74—116 |

ABRAHAM G. STONE, *Primary Examiner.*

J. R. OAKS, *Assistant Examiner.*